United States Patent [19]

Hunter, Jr.

[11] Patent Number: 5,672,184
[45] Date of Patent: Sep. 30, 1997

[54] PULSE DETONATION DEVICE FOR COAL GASIFICATION

[75] Inventor: Louis G. Hunter, Jr., Fort Worth, Tex.

[73] Assignee: Lockheed Corporation, Fort Worth, Tex.

[21] Appl. No.: 356,156

[22] Filed: Dec. 15, 1994

Related U.S. Application Data

[63] Continuation-in-part of Ser. No. 265,384, Jun. 24, 1994, Pat. No. 5,579,633.

[51] Int. Cl.$^6$ .................................................. C10J 3/70
[52] U.S. Cl. .......................... 48/77; 48/197 R; 48/203
[58] Field of Search ..................... 48/197 R, 203, 48/206, 209, 210.77; 55/523, 302, 341.1; 95/280

[56] References Cited

U.S. PATENT DOCUMENTS

| | | | |
|---|---|---|---|
| 2,526,651 | 10/1950 | Garbo | 55/523 |
| 2,729,552 | 1/1956 | Nelson et al. | 48/203 |
| 2,745,861 | 5/1956 | Bodine | 48/206 |
| 2,899,287 | 8/1959 | Paris | 48/206 |
| 2,963,354 | 12/1960 | Atwell | 48/206 |
| 4,441,892 | 4/1984 | Schuster | 48/206 |
| 5,059,404 | 10/1991 | Mansour et al. | 48/209 |
| 5,167,676 | 12/1992 | Nakaishi et al. | 55/302 |
| 5,242,472 | 9/1993 | Sellakumar | 95/280 |
| 5,243,922 | 9/1993 | Rehmat et al. | 48/197 R |
| 5,254,144 | 10/1993 | Provol | 55/302 |
| 5,345,758 | 9/1994 | Bussing | |

FOREIGN PATENT DOCUMENTS

| | | | |
|---|---|---|---|
| 8102581 | 9/1981 | WIPO | 48/209 |

OTHER PUBLICATIONS

"Proceedings of the Coal-Fired Power System 94—Advances in IGCC and PFBC Review Meeting", vol. II, Jun. 1994, pp. 36–67, 535–580.

Westinghouse Advanced Particle Filter System, pp. 152–165.

Bussing and Pappas, "An Introduction to Pulse Detonation Engines", 32nd Aerospace Sciences Meeting, Jan. 1994/Reno, NV.

*Primary Examiner*—Timothy McMahon
*Attorney, Agent, or Firm*—James E. Bradley

[57] ABSTRACT

A coal gasification system has a pulse detonation device. The pulse detonation device is employed to discharge hot exhaust pulses into the coal gasifier. Also, a pulse detonation device discharges reverse flow pulses into a ceramic candle filter system to dislodge particulate build up on the candles. The pulse detonation device utilizes a rotatable core feed cylinder. The core feed cylinder is carried within an inner side wall of the stationary annular detonation chamber. The core feed cylinder has ports in the side wall that will register with ports in the inner side wall of the annular detonation chamber at least once each revolution. Fuel is introduced through valves mounted to the outer side wall of the annular detonation chamber.

18 Claims, 5 Drawing Sheets

PULSE DETONATION DEVICE FOR COAL GASIFICATION

CROSS REFERENCE TO RELATED APPLICATION

This is a continuation-in-part application of application Ser. No. 08/265,384, filed Jun. 24, 1994 now U.S. Pat. No. 5,579,633.

BACKGROUND OF THE INVENTION

1. Field of the Invention

This invention relates in general to coal gasification systems, and in particular to the pulse detonation device which is used to enhance the gasification process and also for cleaning candle type ceramic filters used in the coal gasification process.

2. Description of the Prior Art

Coal gasification is becoming an increasingly important means for generating electricity. In a coal gasification system, a large chamber or gasifier is loaded with limestone and coal. Air and steam are blown into the gasifier while the coal is burned. Only a part of the oxygen needed for stoichiometric combustion is provided, typically around 20 percent. Consequently, only a part of the available carbon is consumed by combustion. The remaining carbon is consumed in gasification reactions with carbon dioxide, steam and hydrogen, creating product or fuel gases. The fuel gases are subsequently burned in a combustion chamber for powering a gas turbine.

The gasifier is operated at high temperatures, which result in some molten slag in the bed of coal. The product gases are rich in fuel, but at high pressure and high temperature. These gases also contain pollutants which must be cleaned. The product gases flow through a filtration system which typically includes a cyclone separator. The product gases are then further cleaned. One new technique is the use of ceramic candle filters. The ceramic candles are tubular members located within a chamber or plenum. The fuel gases flow through the porous walls of the candles, with the particles collecting on the exterior of the candles. Periodically, a pulse of air is discharged into the interior of the candles to dislodge the build up of particles on the candles.

The fuel gases then flow to a combustor which burns the gases for use in powering a gas turbine. The gas turbine generates electricity. Also, the hot residue gas from the gas turbine may be used to generate steam for operating a steam generator.

Coal gasification has economic potential, however, there are some drawbacks. The slagging must be dealt with to prevent the bed of coal from fusing. The ceramic candle filters are subject to microcracks because of the difference in temperature of the cleaning pulses discharged into them as compared to the high temperature gases flowing through them.

SUMMARY OF THE INVENTION

In the invention, the gasifier system is enhanced by the use of a pulse detonation device. Pulse detonation device, in general, are known, and have been considered for theoretical use with jet aircraft for propulsion. A pulse detonation engine is an apparatus which produces a high pressure exhaust from a series of repetitive detonations within a detonation chamber. The process is a constant volume heat addition process. The gaseous fuel is detonated within a chamber, causing a pulse detonation wave which propagates at supersonic speeds. The detonation wave compresses the fluid within the chamber, increasing its pressure, temperature and density.

In this invention, a pulse detonation device is connected to the gasifier for discharging high pressure steam, oxygen and other exhaust products into the bed of coal. The high temperature, high pressure exhaust pulses enhance the gasification process, keeping the bed from excessive slagging.

Also, preferably a pulse detonation device, which may be the same one as used with the gasifier, is employed in connection with a candle filter system. The high pressure hot exhaust from the pulse detonation device is discharged into the hollow interiors of the candles periodically to dislodge the pulses. The exhaust pulse temperature is preferably cooled somewhat so that it is within an acceptable range of the operating temperature of the candles.

DETAILED DESCRIPTION OF THE INVENTION

Figure 1:
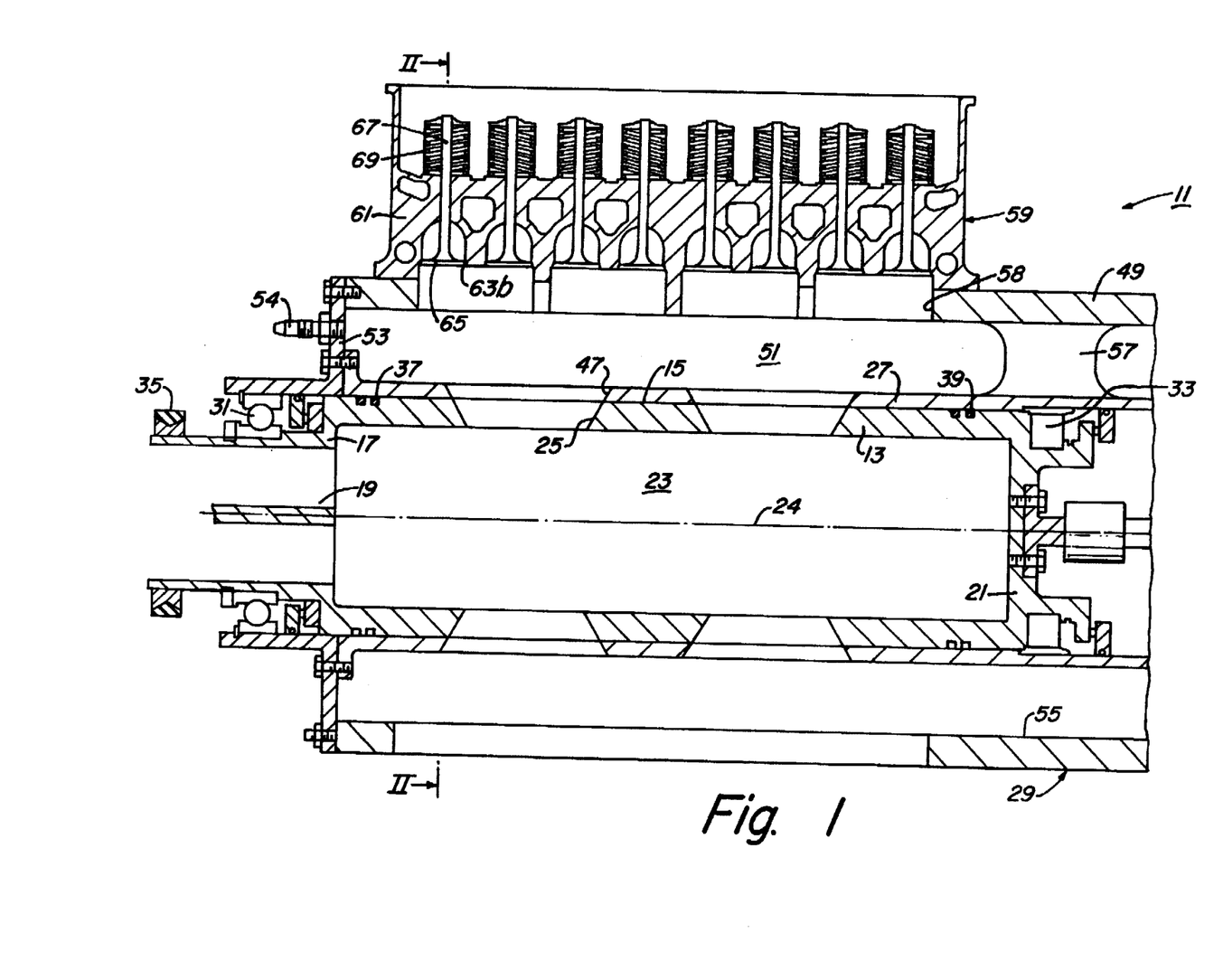
FIG. 1 is a vertical sectional view illustrating a pulse detonation apparatus constructed in accordance with this invention.

Referring to FIG. 1, pulse detonation apparatus 11 has a core feed cylinder 13. Core feed cylinder 13 is a cylindrical member having a cylindrical sidewall 15 and a forward end 17. A plurality of inlet ports 19 extend through forward end 17. Inlet ports 19 are preferably connected to a purge gas, such as compressed air. Core feed cylinder 13 has a rearward end 21 that is closed, defining a cylindrical cavity 23 located on a longitudinal axis 24.

There are four core feed cylinder outlet ports 25 formed in sidewall 15. Each core feed cylinder outlet port 25 is circular and of the same dimension in the embodiment shown. The more forward two of the core feed cylinder outlet ports 25 are spaced the same distance from forward end 17 and located 180 degrees from each other. The more rearward core feed cylinder outlet ports 25 are spaced rearward of the forward two and also located 180 degrees from each other.

Core feed cylinder 13 is carried rotatably inside an inner sidewall 27 of an annular detonation chamber 29. Core feed cylinder 13 is supported by a forward set of bearings 31 and a rearward set of bearings 33. A drive means, such as a pulley and belt 35, is mounted to inner sidewall 27 and rotates core feed cylinder 13 relative to inner sidewall 27.

A pair of forward circular seals 37 and rearward circular seals 39 seal between core feed cylinder 13 and inner sidewall 27. Circular seals 37, 39 are perpendicular to axis 24. The forward seals 37 are located forward of the core feed cylinder outlet port 25 while the rearward circular seals 39 are located rearward of the core feed cylinder outlet ports 25.

Figure 2:
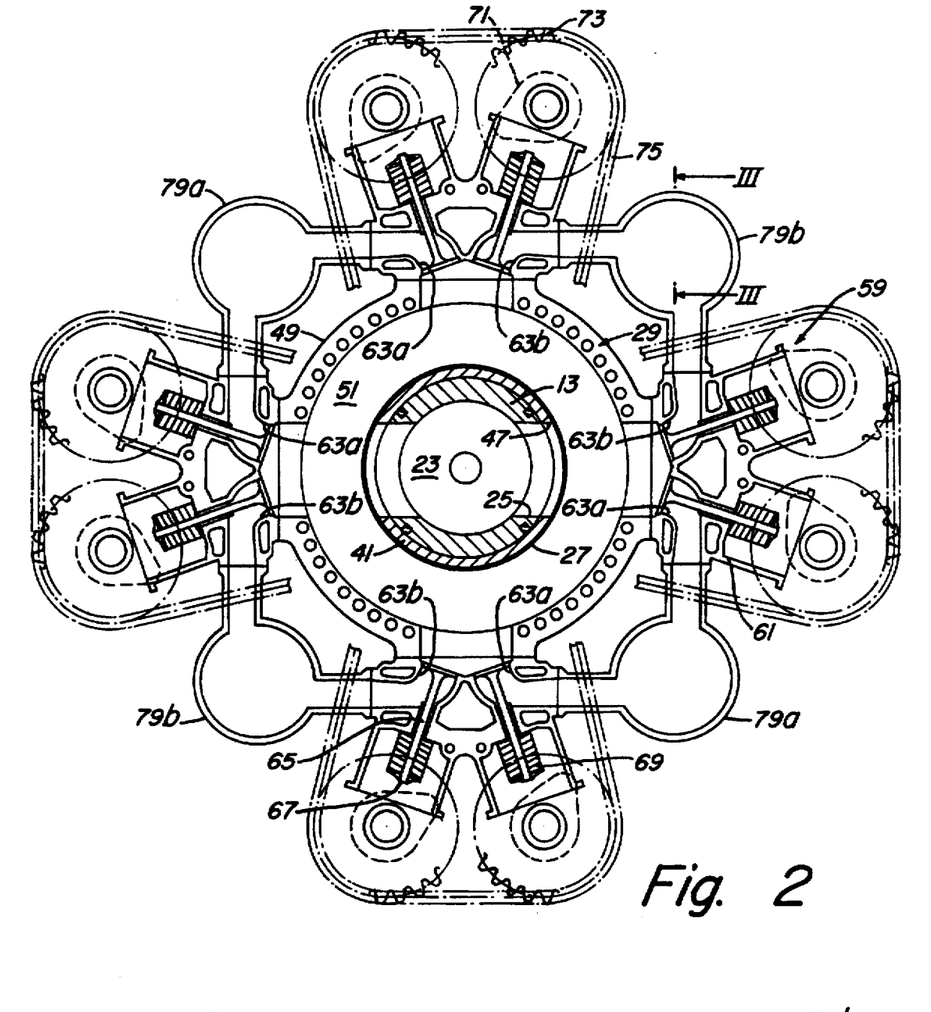
FIG. 2 is another sectional view of the pulse detonation apparatus of FIG. 1, taken along the line II—II and showing an additional valve manifolds that are not shown in FIG. 1.
Figure 4:
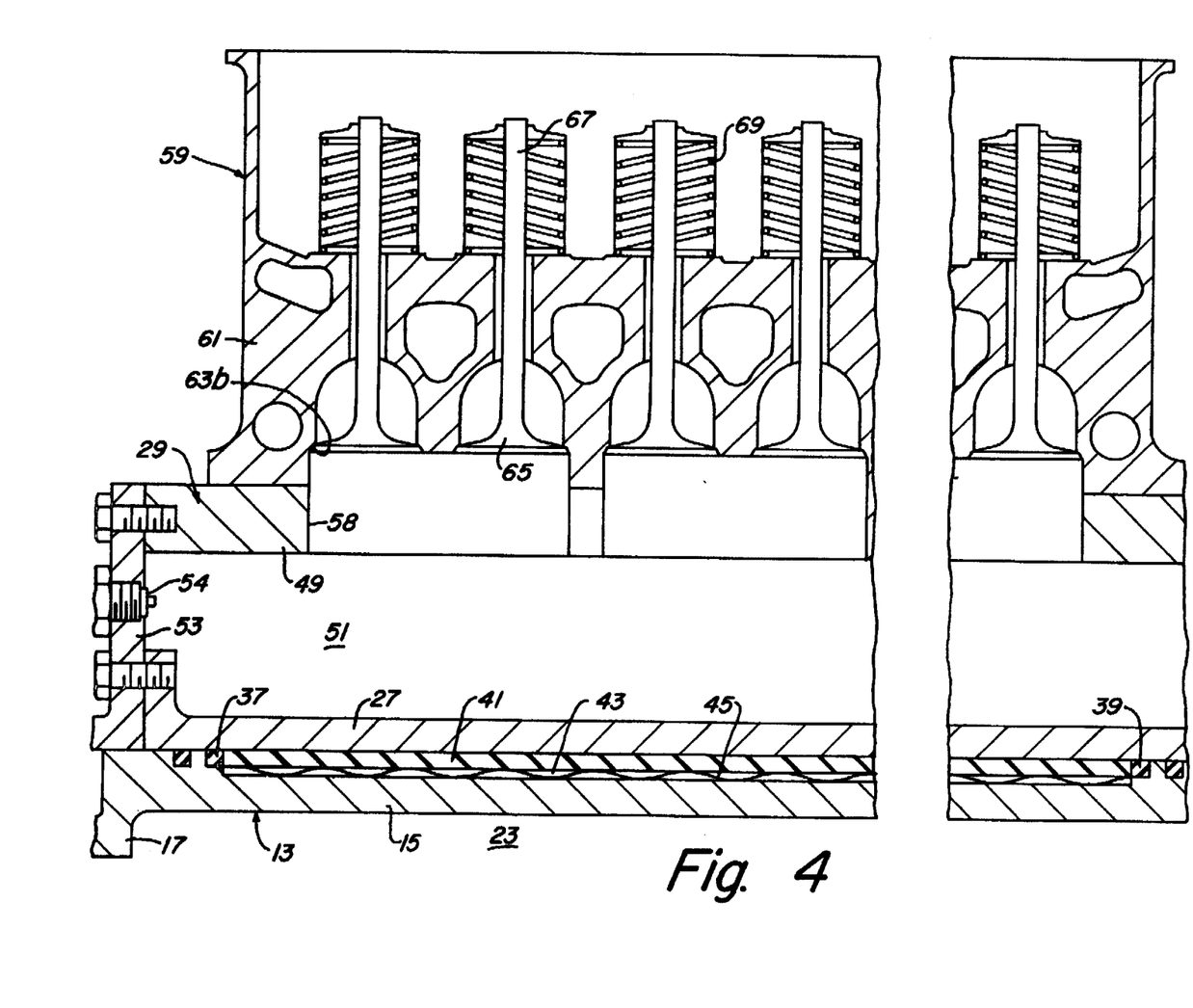
FIG. 4 is an enlarged partial sectional view of a portion of the pulse detonation apparatus of FIG. 1.

As shown in FIGS. 2 and 4, four linear seals 41 serve along with the circular seals 37, 39 to seal core feed cylinder outlet ports 25. Linear seals 41 are spaced about the circumference of core feed cylinder 13, with each of the core feed cylinder outlet ports 25 located between two of the linear seals 41. As shown particularly in FIG. 4, each linear seal 41 is located in a straight groove 43 that is parallel to axis 24 (FIG. 1). A wave spring 45, located in groove 43, urges linear seal 41 radially outward to seal against inner sidewall 27. Preferably, cooling fluid passages (not shown) deliver a cooling fluid to groove 43. Additionally, oil passages (not shown) extend through core feed cylinder 13 for delivering oil to the bearings 31, 33 (FIG. 1) and to the circular seals 37, 39.

The inner sidewall 27 has four detonation chamber ports 47, positioned to register with the outlet ports 25 twice per revolution of core feed cylinder 13. When registered, the purge gas from core feed cylinder 13 flows into the detonation chamber 29. Detonation chamber 29 also has an outer sidewall 49 which is spaced radially outward from inner sidewall 27. This results in detonation cavity 51 for detonations to occur. Detonation cavity 51 has a forward cavity wall 53. One or more igniters 54, such as spark plugs, are located in forward wall 53 for creating a spark at the forward end of detonation cavity 51 to ignite an oxygen fuel mixture. Igniters 54 have ignition energies of three to five joules each. Detonation cavity 51 has an open rearward end 55 for discharging detonation waves. Circumferentially spaced apart braces 57 support outer sidewall 49 with inner sidewall 27 and allow the passage of detonation waves out the rearward end 55.

In the preferred embodiment, an external valve means introduces a measured or discrete amount of gaseous fuel into detonation cavity 51. Outer sidewall 49 has a plurality of elongated openings 58. An external valve assembly 59 mounts to each of the openings 58. FIG. 1 shows only one of the valve assemblies 59, while FIG. 2 shows four of the valve assemblies 59 spaced equally around outer sidewall 49. Each of the valve assemblies 59 includes a valve housing 61. Valve housing 61 secures sealingly to opening 58.

As shown in FIG. 2, each valve housing 61 has sixteen valve seats 63a, 63b. There are two valve seats 63a, 63b in a pair spaced adjacent each other in a circumferential direction, and eight of these pairs 63a, 63b in a longitudinal direction. A plurality of valves 65 are carried within each valve housing 61, each engaging one of the seats 63a, 63b. Each valve 65 has a rod 67 that extends upward from valve housing 61. A spring 69 urges each valve 65 to the closed or upper position. Two cams 71 are mounted in each valve housing 61, shown in FIG. 2. Each cam 71 has eight lobes (only one shown) for engaging the rods 67 to reciprocate the valves 65. Cams 71 are driven by sprockets 73. Sprockets 73 are driven by chains 75.

Preferably, there are two supply manifolds 79a and two supply manifolds 79b, as shown in FIG. 2. Each supply manifold 79a is in communication with the intakes of the valve seats 63a of two adjacent valve housings 61. Each supply manifold 79b is in communication with the intakes of the valve seats 63b of two adjacent valve housings 61. In the embodiment shown in FIG. 3, each of the supply manifolds 79a, 79b is divided by partitions 81 into eight separate sections or intakes 83, 85, 87, 89, 91, 93, 95 and 97. Partitions 81 are equally spaced longitudinally. The most forward intakes 83 of the two manifolds 79b will supply a gaseous fluid only to the most forward valve seats 63b. The most forward intakes 83 of the two manifolds 79a will supply a gaseous fluid only to the most forward valve seats 63a. The other intakes 85, 87, 89, 91, 93, 95 and 97 will supply gaseous fluid only to respective valve seats 63a, 63b located rearward of the most forward valve seats 63a, 63b.

Figure 3:
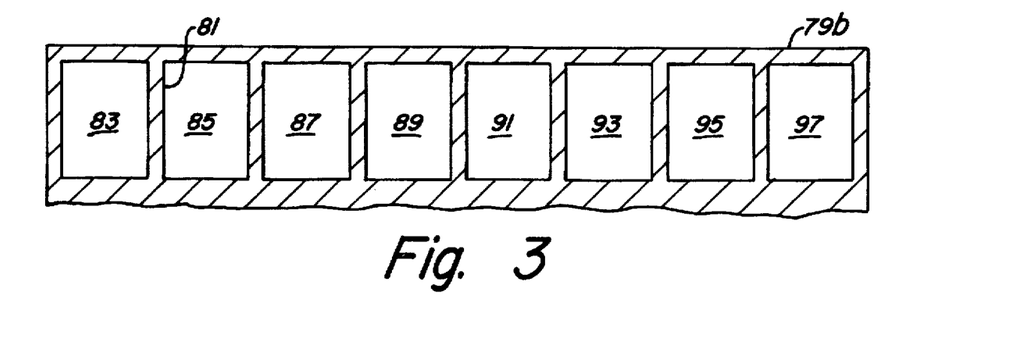
FIG. 3 is a partial sectional view of the pulse detonation apparatus of FIG. 1, taken along the line III—III of FIG. 2.

Preferably certain of the intakes 83, 85, 89, 91, 93, 95 and 97 of at least some of the manifolds 79a, 79b are supplied with different gaseous fluids. For example, the most forward intake 83 of at least one of the manifolds 79b may be supplied with a gas having a high oxygen content. Preferably pure oxygen is delivered to the intakes 83 of each of the manifolds 79b, supplying oxygen to the four most forward valve seats 63b. A hydrocarbon fuel such as propane may be supplied to intakes 83 of each of the manifolds 79a, supplying fuel to the four most forward valve seats 63a. Timing the cams 71 appropriately results in a high oxygen content fuel at the forward end of annular cavity 51 for detonation. Alternately, the oxygen and fuel may be premixed and supplied to all of the intakes 83 of all four manifolds 79a, 79b.

Preferably, at least some of the more rearward intakes, such as intakes 85, 87, 89, 91, 93, 95 and 97 provide a mixture to detonation cavity 51 having less oxygen content, such as ambient air with fuel. Alternately, ambient air and fuel may be employed only at a few of the more rearward intakes, such as intakes 95 and 97. Some of the intermediate intakes, such as intakes 85, 87, 89 and 91 may provide a mixture of air, additional oxygen, and fuel. The decrease in oxygen content from the forward end to the rearward end may be gradual. This may be accomplished by premixing the fuel with air and differing amounts of oxygen for supplying to intakes 85, 87, 89, and 91. Or, fuel only may be supplied to all of the intakes 85, 87, 89, 91, 93, 95 and 97 of one or both manifolds 79a, while air and varying degrees of oxygen are supplied in varying mixtures to the intakes 85, 87, 89, 91, 93, 95 and 97 of the manifolds 79b.

In this manner, the valve assemblies 59 cause the gaseous fuel near the forward end of detonation cavity 51 to be richer in oxygen content than in a more rearward direction along longitudinal axis 24. This higher oxygen content at the forward end facilitates detonation by the igniter 54 into a detonation wave. The air fuel mixture will continue the propagation of the detonation wave. The exhaust gas produced comprises steam and carbon dioxide.

In operation, belt and pulley 35 will rotate core feed cylinder 13 relative to detonation chamber 29. The rotation speed may vary, but is preferably approximately 2000 rpm. Chains 75 are driven to rotate cams 71. In one example, premixed propane and pure oxygen is supplied to the most forward intakes 83 of the manifolds 79a, 79b. At the same time, premixed propane and air is delivered to the remaining intakes 85, 87, 89, 91, 93, 95 and 97 of the manifolds 79a, 79b. Cams 71 open the valve seats 63a, 63b, causing the delivery of the oxygen rich gaseous fuel into the forward end of detonation cavity 51 and the air fuel mixture into the remaining portion. At the same time that cams 71 open the valve seats 63a, 63b, ports 25, 47 will be out of registry, sealing ambient purge air in core feed cylinder 13 from entering the detonation cavity 51.

Valve seats 63a, 63b will close due to rotation of cams 71, and core feed cylinder ports 25 will remain closed due to the rotational position of core feed cylinder 13. Then igniter 54 ignites the oxygen fuel mixture, causing an initial detonation wave. The detonation wave moves at supersonic speeds, propagates with the air fuel mixture, and discharges as a high pressure exhaust out detonator cavity 51. An expansion wave, also referred to herein as a detonation wave, moves forward, reflecting off the forward wall 53 and discharging out the rearward end after the initial detonation wave.

After the expansion wave passes from the rearward end 55, the continuous rotation of the core feed cylinder 13 causes the ports 25, 47 to register. The purge air flowing through inlet port 19 flows through the ports 25, 47 and out the detonation cavity 51. The purge air blows the burned gases from the detonation cavity 51. The ports 25 of the rotating core feed cylinder 13 will then rotate out of alignment with the ports 47 and the cycle described above will be repeated. The frequency of the exhaust pulses is in a range from 10-80 Hz, preferably 20-30 Hz, with exhaust temperatures of 4000° F., and pressures with spikes up to 50 atmospheres.

Figure 5:
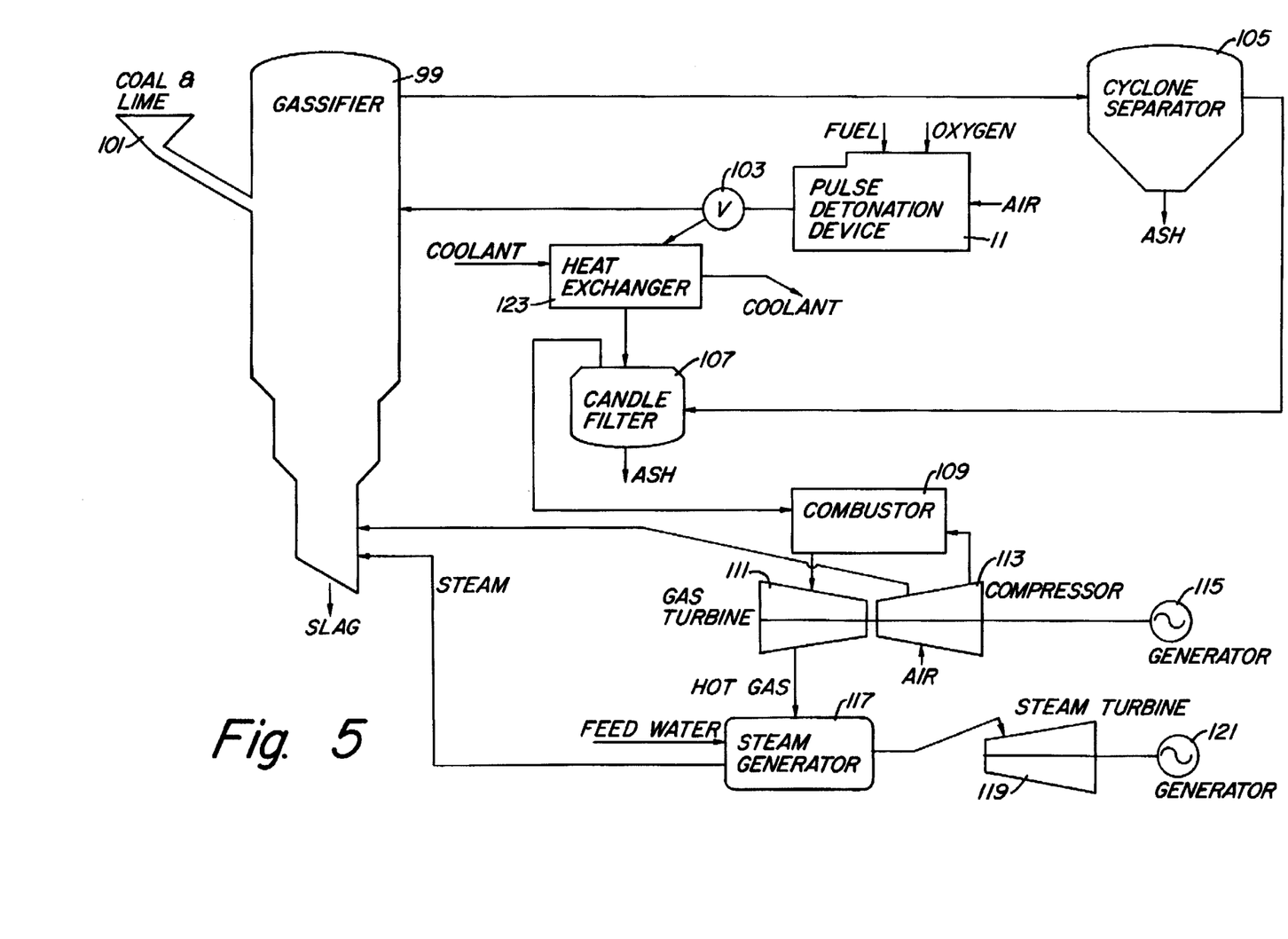
FIG. 5 is a block diagram illustrating a gasification system utilizing the pulse detonation device shown in FIGS. 1–4.

Referring to FIG. 5, a coal gasification system is illustrated schematically, including a gasifier 99, which is shown as a fixed bed type. Gasifier 99 is a large chamber operated at a high temperature and pressure. Gasifier 99 has a hopper 101 for receiving coal and lime which is burned within gasifier 99. Steam and air are injected. The coal reacts with oxygen and steam, producing a temperature of approximately 2200° K. in the flame zone. The temperature of the gas mixture is reduced to approximately 1760° K. by heat losses. At this temperature, the coal is converted primarily to carbon monoxide, hydrogen and carbon dioxide. Much of the ash is converted to molten slag. A part of this molten slag flows down the walls where it solidifies before being removed. Another part leaves the gasifier 99 as fly ash along with the product gas. The product or fuel gas leaving the gasifier is at a high temperature, such as 1200° K. and contains particulates or fly ash.

The pulse detonation device 11 is connected to the gasifier 99 for providing hot pulses of steam exhaust into the bed of coal within the gasifier 99. The exhaust pulses from the pulse detonation device 11 pass through a valve 103, and serve to enhance the burning process as well as prevent slagging. The pulses free up the bed, causing movement of the burning coal, to retard slag glomeration. The purge air between cycles for the pulse detonation device 11 also discharges into the coal bed.

The fuel gases will be initially filtered to remove sulphur and particulates by conventional methods, such as a cyclone separator 105. The cleaner fuel gas then flows to a candle filter assembly 107. Candle filter assembly 107 further cleans the high temperature fuel gas. The fuel gas then flows to a combustor 109 where is it is burned. The high temperature hot gas from combustor 109 is used to drive a gas turbine 111. Gas turbine 111 operates a compressor 113 and generates electricity with a generator 115. Compressor 113 is supplied with air for discharging into gasifier 99.

The hot gas departing from gas turbine 111 passes to a steam generator 117 which is supplied with feed water. Steam generator 117 generates steam which drives a conventional steam turbine 119. Steam turbine 119 drives a generator 121, also from generating electricity. Steam from the steam generator 117 is also applied to the gasifier 99.

Periodically, the candle filter 107 must be cleaned of deposits of fly ash and other particulates on the candles therein. This is handled in the embodiment of FIG. 5 by periodically shutting off fuel gas flow through a portion of the candle filter 107 and shifting valve 103. This diverts the exhaust pulses from pulse detonator 11 through a heat exchanger 123 rather than to gasifier 99. Coolant is supplied to heat exchanger 123 for reducing the temperature of the exhaust pulses to a selected range within the operating temperature of candle filter 107. The cooler exhaust pulses pass through heat exchanger 123 and flow in the reverse direction into candle filter 107 for cleaning the candles therein.

Figure 6:
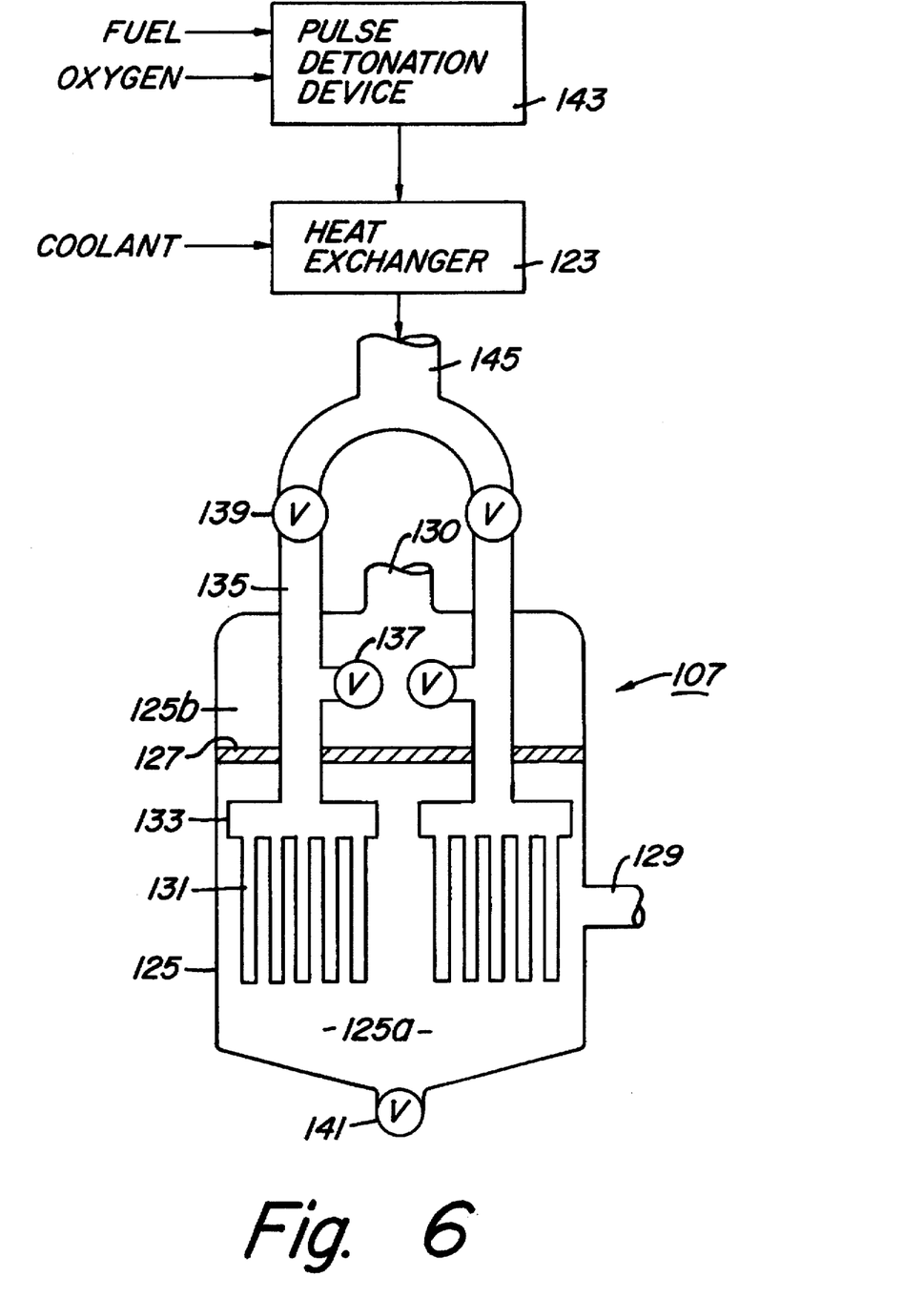
FIG. 6 is a schematic view of a candle filter employed with the gasification system of FIG. 5, and shown employed with another pulse detonation device.

Referring to FIG. 6, candle filter assembly 107 is shown in more detail than in FIG. 5. Candle filter assembly 107 includes a housing or chamber 125. Chamber 125 is divided by a sealed partition 127 into plenums 125a and 125b. The inlet 129 leads to plenum 125a for receiving the product gas from cyclone separator 105 (FIG. 5). Outlet 130 is located in plenum 125b. Outlet 130 leads to combustor 109 (FIG. 5).

A plurality of candles 131 are contained within plenum 125a. In the embodiment shown, two sets of candles 131 are shown, although a number of other sets could be employed as well. Each of the sets includes a plurality of candles 131 mounted to a common manifold 133. Each candle 131 is a porous ceramic hollow tube with a closed end, the hollow interior being in communication with manifold 133. A passage 135 leads from each manifold to the exterior. A valve 137 in passage 135 selectively allows the product gas flowing through candles 131 to flow into upper plenum 125b and out the outlet 130. Another valve 139 selectively closes passage 135 to the exterior. A valve 141 is used for periodically cleaning build up of ash on the bottom of chamber 125.

In FIG. 6, an additional pulse detonator device 143 is shown for cleaning filter 107, rather than pulse detonator device 11 of FIG. 5. Pulse detonator device 143 may be identical to pulse detonator device 11 and discharges through heat exchanger 123. Heat exchanger 123 receives a cooling fluid for lowering the temperature of the exhaust pulses discharging from pulse detonator 143. The temperature may be as high as 4000° F., and it is lowered to an acceptable range within the operating temperature of the candles 131 (FIG. 6) in candle filter assembly 107. The operating temperature of candles 131 is approximately 2000° to 2200° F., and heat exchanger 123 cools the exhaust pulses preferably to within a range of 180° F. of that temperature. The cooled exhaust pulses from heat exchanger 123 flow through a conduit 145 (FIG. 6) to candle filter assembly 107.

In the operation of the candle filter assembly 107, as shown in FIG. 6, the product gas flows through inlet 129, through the side walls of candles 131, up the interiors of each candle 131, and up the passage 135, out the normally open valves 137 into upper plenum 125b. The product gas flows out the outlet 130 to the combustor 109 (FIG. 5). Valves 139 will normally be closed, and normally both sets of candles 131 will be in operation. Periodically, pulse detonation device 143 is employed to clean the build up of particulates on the candles 131. As there are at least two sets of candles 131, each on parallel paths, as shown, one set will continue cleaning product gas flowing to combustor 109, while the other set will be cleaned by pulse detonator 143.

Assuming, for example, that the set of candles 131 on the left are to be cleaned, the set of candles on the right will remain on line to allow the fuel gas to continue to flow. The valve 139 on the right will be remain closed, while the valve 139 on the left will be opened. The valve 137 on the right will remain open, while the valve 137 on the left set will be closed. The exhaust pulses will be cooled by heat exchanger 123 to a temperature that is within a selected range of the operating temperature of the candle filter assembly 107. The exhaust pulses flow into the passage 135 on the left at substantially the same temperature as candles 131. Because of the reverse direction flow, the high pressure exhaust pulses dislodge the particles on the exteriors of the candles 131.

The exhaust pulses are preferably delivered at a frequency in the range from 10 to 80 Hz, preferably about 20–30 Hz. However, the duration will be fairly short, such as just a few seconds. For cleaning of the other bank of candles 131, valve 139 on the left side will be closed, and valve 137 on the left side opened. The procedure may then be repeated with the right side being cleaned while the left side remains on line. The exhaust pulses from pulse detonator device 143 may be diverted into gasifier 99 when not be used for cleaning of candles 131, so as to avoid restarting pulse detonator device 143 while candles 131 need to be cleaned.

The invention has significant advantages. The pulse detonation device enhances the gasification of the coal in the gasifier by retarding slag build up. The pulse detonation device provides cleaning for the candle filters without excessive temperature shock, which lead to cracks of the candles.

While the invention has been shown in only one of its forms, it should be apparent to those skilled in the art that it is not so limited, but is susceptible to various changes without departing from the scope of the invention. For example, if desired, the pressure of the exhaust pulses of the pulse detonation device could be reduced prior to entering the candle filter assembly.

I claim:

1. In a method of gasifying coal wherein coal within a gasifier having a gasifier chamber containing a bed of coal is converted to fuel gases by partial combustion, the improvement comprising:
   providing at least one gasifier pulse detonation device which has a combustion chamber with an open discharge end;
   communicating the discharge end of the gasifier pulse detonation device to the gasifier chamber within the bed of coal;
   injecting a discrete gaseous fuel mixture into the combustion chamber, and igniting the fuel mixture to create a detonation wave which discharges from the discharge end, then repeating the injection and ignition of the gaseous fuel mixture at a selected frequency to produce high energy hot exhaust pulses; and
   directing the pulses from the gasifier pulse detonation device into the bed of coal in the gasifier to enhance movement within the bed of coal to improve the conversion of coal into gases.

2. The method according to claim 1 wherein the gasifier pulse detonation device provides the exhaust pulses at a frequency in the range from 10 to 80 Hz.

3. The method according to claim 1 wherein a portion of the exhaust pulses comprises steam.

4. The method according to claim 1 wherein the exhaust pulses produced by the pulse detonation device are discharged out of the combustion chamber at a supersonic speed.

5. The method according to claim 1 further comprising:
   purging the combustion chamber after each detonation by discharging a purge gas through the chamber to clean the chamber of combustion products before the next detonation; and
   directing the purge gas out the discharge end into the gasifier.

6. The method according to claim 1 wherein:
   the method of gasifying coal further comprises filtering particles from the fuel gases of the gasifier by the following steps:
   mounting a plurality of ceramic filtration candles in a filter chamber, each of the candles having a porous side wall and an interior passage, the interior passages being connected to an outlet manifold which leads out of the filter chamber; and
   flowing the fuel gases into the filter chamber, through the side walls of the candles into the interior passages, through the outlet manifold and out of the filter chamber, filtering the fuel gases of particles as the fuel gases pass through the side walls of the candles; and wherein the method further comprises periodically cleaning the side walls of the candles of deposited particles by the following steps:
   providing at least one filter pulse detonation device which has a combustion chamber with an open discharge end;
   injecting a discrete gaseous fuel mixture into the combustion chamber of the filter pulse detonation device, and igniting the fuel mixture to create a detonation wave which discharges from the discharge end, then repeating the injection and ignition of the gaseous fuel mixture at a selected frequency to produce high energy hot exhaust pulses; and
   momentarily ceasing flow of fuel gases through the candles to be cleaned, and directing the pulses from the filter pulse detonation device into the outlet manifold and into the interior passages of the candles, dislodging deposited particles from the side walls.

7. The method according to claim 1 wherein:
   the method of gasifying coal further comprises filtering particles from the fuel gases of the gasifier by the following steps:
   mounting a plurality of ceramic filtration candles in a filter chamber, each of the candles having a porous side wall and an interior passage, the interior passages being connected to an outlet manifold which leads out of the filter chamber; and
   flowing the fuel gases into the filter chamber, through the side walls of the candles into the interior passages, which heats the candles to an operation temperature, through the outlet manifold and out of the filter chamber, filtering the fuel gases of particles as the fuel gases pass through the side walls of the candles; and wherein the method further comprises periodically cleaning the side walls of the candles of deposited particles by the following steps:
   providing at least one filter pulse detonation device which has a combustion chamber with an open discharge end;
   injecting a discrete gaseous fuel mixture into the combustion chamber of the filter pulse detonation device and igniting the fuel mixture to create a detonation wave which discharges from the discharge end, then repeating the injection and ignition of the gaseous fuel mixture at a selected frequency to produce high energy hot exhaust pulses;
   cooling the exhaust pulses to a selected level compatible with the operating temperature of the candles; and
   momentarily ceasing flow of fuel gases through the candles to be cleaned and directing the cooled exhaust pulses into the outlet manifold and into the interior passages, dislodging deposited particles from the side walls.

8. The method according to claim 1 wherein:

the method of gasifying coal further comprises filtering particles from the fuel gases of the gasifier by the following steps:

mounting a plurality of ceramic filtration candles in a filter chamber, each of the candles having a porous side wall and an interior passage, the interior passages being connected to an outlet manifold which leads out of the filter chamber; and flowing the fuel gases into the filter chamber, through the side walls of the candles into the interior passages, through the outlet manifold and out of the filter chamber, filtering the fuel gases of particles as the fuel gases pass through the side walls of the candles; and wherein the method further comprises periodically cleaning the side walls of the candles of deposited particles by the following steps:

momentarily ceasing flow of fuel gases through the candles to be cleaned; and periodically diverting the high energy exhaust pulses from at least one of the gasifer pulse detonation devices from the gasifier to the outlet manifold of the filter chamber and into the interior passages, dislodging deposited particles from the side walls.

9. The method according to claim 1 wherein:

the method of gasifying coal further comprises filtering particles from the fuel gases of the gasifier by the following steps:

mounting a plurality of ceramic filtration candles in a filter chamber, each of the candles having a porous side wall and an interior passage, the interior passages being connected to an outlet manifold which leads out of the filter chamber; and flowing the fuel gases into the filter chamber, through the side walls of the candles into the interior passages, through the outlet manifold and out of the filter chamber, filtering the fuel gases of particles as the fuel gases pass through the side walls of the candles and heating the candles to an elevated operating temperature; and wherein the method further comprises periodically cleaning the side walls of the candles of deposited particles by the following steps:

periodically directing the exhaust pulses from at least one of the gasifier pulse detonation devices to a heat exchanger and cooling the exhaust pulses to a selected level compatible with the operating temperature of the candles; and momentarily ceasing flow of fuel gases through the candles to be cleaned and directing the cooled exhaust pulses into the outlet manifold and into the interior passages, dislodging deposited particles from the side walls.

10. In a method of gasifying coal wherein a bed of coal within a gasifier is converted to fuel gases by partial combustion, the improvement comprising:

providing at least one gasifier pulse detonation device which has a combustion chamber with an open discharge end;

communicating the discharge end of the gasifier pulse detonation device to the bed of coal within the gasifier;

injecting a discrete gaseous fuel mixture into the combustion chamber and igniting the fuel mixture to create a detonation wave which discharges from the discharge end, then repeating the injection and ignition of the gaseous fuel mixture at a selected frequency to produce high energy hot exhaust pulses;

directing the pulses from the gasifier pulse detonation device into the bed of coal within the gasifier to enhance the conversion of coal into fuel gases by retarding slag glomeration;

mounting a plurality of ceramic filtration candles in a filter chamber, each of the candles having a porous side wall and an interior passage, the interior passages being connected to an outlet manifold which leads out of the filter chamber;

flowing the fuel gases into the filter chamber, through the side walls of the candles into the interior passages, through the outlet manifold and out of the filter chamber, filtering the fuel gases of particles as the fuel gases pass through the side walls of the candles; and wherein the method further comprises periodically cleaning the side walls of the candles of deposited particles by the following steps:

providing at least one filter pulse detonation device which has a combustion chamber with an open discharge end;

injecting a discrete gaseous fuel mixture into the combustion chamber of the filter pulse detonation device, and igniting the fuel mixture to create a detonation wave which discharges from the discharge end, then repeating the injection and ignition of the gaseous fuel mixture at a selected frequency to produce high energy hot exhaust pulses; and momentarily ceasing flow of fuel gases through the candles, and directing the pulses from the filter pulse detonation device into the outlet manifold and into the interior passages of the candles, dislodging deposited particles from the side walls.

11. The method according to claim 10, further comprising:

diverting exhaust pulses of the filter pulse detonation device into the gasifier while not discharging exhaust pulses into the candle filter for cleaning.

12. The method according to claim 10, further comprising:

cooling the exhaust pulses of the filter pulse detonation device to a selected level compatible with the operating temperature of the candles prior to discharging the exhaust pulses into the candles.

13. The method according to claim 10 wherein the filter and gasifier pulse detonation devices provide the exhaust pulses at a frequency in the range from 10 to 80 Hz.

14. A method of gasifying coal, comprising:

introducing coal into a gasifier, creating a bed of coal;

injecting air and steam into the gasifier and partially combusting the coal by heat within the gasifier to produce fuel gas;

providing at least one gasifier pulse detonation device which has a combustion chamber with an open discharge end;

communicating the discharge end of the gasifier pulse detonation device to the bed of coal within the gasifier;

injecting substantially pure oxygen and a discrete gaseous fuel mixture into the combustion chamber, and igniting the fuel mixture to create a detonation wave which discharges from the discharge end at a supersonic speed, then repeating the injection and ignition of the gaseous fuel mixture at a selected frequency to produce high energy hot exhaust pulses; and directing the pulses from the gasifier pulse detonation device into the bed of coal within the gassifier to enhance movement of coal in the bed to improve the conversion of coal into gases.

15. The method according to claim 14 wherein the gasifier pulse detonation device provides the exhaust pulses at a frequency in the range from 10 to 80 Hz.

16. The method according to claim 14 wherein a portion of the exhaust pulses comprises steam.

17. The method according to claim 14 wherein the fuel mixture supplied to the combustion chamber comprises a hydrocarbon and oxygen.

18. The method according to claim 14 further comprising:

purging the combustion chamber after each detonation by discharging a purge gas through the chamber to clean the chamber of combustion products before the next detonation; and directing the purge gas out the discharge end into the gasifier.

* * * * *